United States Patent [19]
Hadgis et al.

[11] Patent Number: 6,075,622
[45] Date of Patent: Jun. 13, 2000

[54] DUPLEX DOCUMENT SCANNER FOR PROCESSING MULTIPLEXED IMAGES WITH A SINGLE DATA PATH

[75] Inventors: George A. Hadgis, Spencerport; Norman M. Lutz, Baldwinsville; Bruce A. Link, Rochester, all of N.Y.

[73] Assignee: Eastman Kodak Company, Rochester, N.Y.

[21] Appl. No.: 08/950,152

[22] Filed: Oct. 14, 1997

[51] Int. Cl.[7] .............................. H04N 1/04; H04N 1/00; H04N 1/387

[52] U.S. Cl. ...................... 358/474; 358/408; 358/444; 358/450; 358/498

[58] Field of Search ..................... 358/498, 450, 358/444, 455, 408, 496, 540, 409, 468, 474; 355/23, 24; 399/374; 395/114–117; H04N 1/387, 1/04, 1/00

[56] References Cited

U.S. PATENT DOCUMENTS

| | | | |
|---|---|---|---|
| 4,673,285 | 6/1987 | Shogren | 355/23 |
| 5,408,338 | 4/1995 | Koike | 358/448 |
| 5,583,659 | 12/1996 | Lee et al. | 358/455 |
| 5,689,347 | 11/1997 | Naoi | 358/474 |
| 5,760,919 | 6/1998 | Acquaviva et al. | 358/450 |
| 5,771,108 | 6/1998 | Ikeda et al. | 358/540 |

*Primary Examiner*—Cheukfan Lee
*Attorney, Agent, or Firm*—Nelson Adrian Blish; David A. Novais

[57] ABSTRACT

A duplex document scanner for processing multiplexed images with a single data path is disclosed. A document transport (131) moves documents past a first image acquisition system (81) and second image acquisition system (82). The first digital image is transferred to a datastore (89) and the second digital image is transferred to a datastore (90). The images are merged into a composite image.

16 Claims, 5 Drawing Sheets

DUPLEX DOCUMENT SCANNER FOR PROCESSING MULTIPLEXED IMAGES WITH A SINGLE DATA PATH

CROSS REFERENCE TO RELATED APPLICATIONS

The present application is related to U.S. application Ser. No. 08/915,812, filed Aug. 21, 1997, by Norman M. Lutz et al., titled "Digital Synchronization of Multiple Asynchronous Data Sources."

FIELD OF THE INVENTION

The present invention relates generally to a duplex document scanner and more particularly, relates to a duplex document scanner for processing multiplexed images with a single data path.

BACKGROUND OF THE INVENTION

It is often necessary to scan documents having information on both sides of the document. Such a document is commonly referred to as a duplex document to distinguish it over simplex documents, documents with an image on only one side.

The prior art discloses various techniques for handling duplex documents. One method, used in electrophotography to copy duplex documents, is to sequentially expose both sides of the duplex sheet forming separate latent images of each side on a photosensitive surface. Each side of the document may be reproduced on a separate output sheet, or on both sides of a single output sheet. This technique, however, requires that the operator place one side of the duplex document on a platen, wait until the exposure is completed, and then turn the document over to expose the second side of the document. This process is slow and labor intensive.

Another method of scanning both sides of a duplex document passes the document through the same copy mechanism twice. This method, however, is slow since the documents must pass through the same copying mechanism twice.

Another method is described in U.S. Pat. No. 4,673,285 entitled "Optical Scanning of Duplex Documents." This method describes a duplex scanner with two optical paths, one to scan the front side of a document, and one to scan the rear side of a document. Both images are aligned and focused through a single movable lens. When scanning the front side of a document, the lens is aligned with the front side optical path and a charge couple device (CCD). The document's motion is then reversed and the lens is shifted into alignment with the rear side optical path and the same CCD. This method is slow since the same document is scanned twice.

A potential problem presented by a duplex scanner is to use one image processing system to support one image acquisition system. Therefore, in a duplex scanner, there would be two image processing systems to support two different image acquisition systems. This method is costly and may require several complex algorithms to be run on both the front and rear images.

SUMMARY OF THE INVENTION

It is an object of the present invention to provide a duplex document scanner wherein the document to be scanned passes through the copying mechanism only one time.

It is also an object of the present invention to provide a duplex document scanner wherein a single image processing engine simultaneously processes information from both sides of the duplex document.

In accordance with one aspect of the invention, a duplex document scanner for processing multiplexed images with a single data path comprises a document transport for moving documents. A first image acquisition system creates a first digital image of a first side of each of the documents. A second image acquisition creates a second digital image of a second side of each of the documents. An image processing board merges the first and second digital images and then processes the multiplexed image.

According to another embodiment of the present invention, a duplex document scanner for processing multiplexed images with a single data path comprises a document transport for moving the document, an input tray which holds at least one document, and a document feeder which moves documents from the input tray to the document transport. An exit hopper accumulates documents after transport through the document transport, and a document sensor tracks position of the documents in the document transport. A first image acquisition system creates a digital image of a first side of the document, and a second image acquisition creates a second digital image of a second side of the document. An image processing board comprising an image multiplexer merges the first digital image and the second digital image.

The above, and other objects, advantages, and novel features of the present invention will become more apparent from the accompanying detailed description thereof when considered in conjunction with the following drawings.

DETAILED DESCRIPTION OF THE INVENTION

Referring now to the drawings wherein like characters designate like or corresponding parts throughout several views, there is shown a duplex document scanner for processing multiplexed images with a single data path.

In duplex document scanning applications, it is desirable to merge both front and rear document image acquisition system outputs into a single composite image. In the preferred embodiment, it is further desirable to merge the outputs of two image acquisition systems which are asynchronous to one another. Generally speaking, the image data from the two asynchronous data streams could be interleaved in one of three possible ways, 1) pixel interleaving where each pixel could be n-bits wide, wherein n is an integer, 2) raster interleaving where a raster is comprised of several n-bit pixels, and 3) document interleaving where a document is comprised of several rasters.

The preferred embodiment involves implementation of a raster interleaving technique. This interleaving of data is described more fully in copending U.S. application Ser. No. 08/915,812, filed Aug. 21, 1997, titled A DIGITAL SYNCHRONIZATION OF MULTIPLE ASYNCHRONOUS DATA SOURCES, by Norman M. Lutz et al, and will be described only briefly here. In this embodiment, image data is received in packets called rasters from image acquisition systems (IAS) at 10 MHz described in more detail below. This data is synchronized according to the method of the present invention using first in, first out (FIFOs), and is then sequenced into a composite raster comprised of both front and rear rasters interleaved. The raster data is output according to an equation for clock out. The output clock would be greater than 20 MHz in this particular instance since there is twice the amount of data that must be processed in the same amount of time. The purpose of such an approach is to implement a single image processor.

Figure 1A:
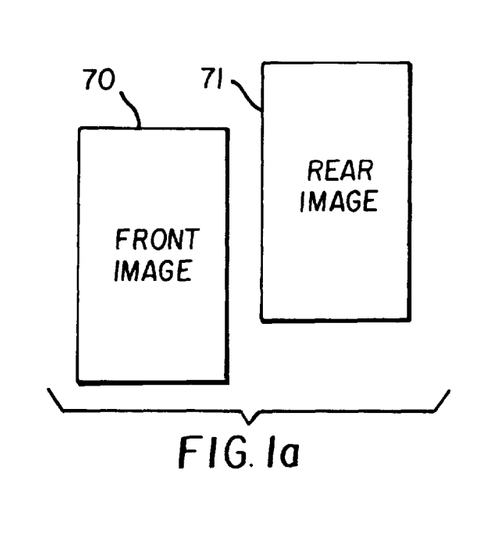
FIG. 1a illustrates the front and rear images of a duplex document.
Figure 1B:
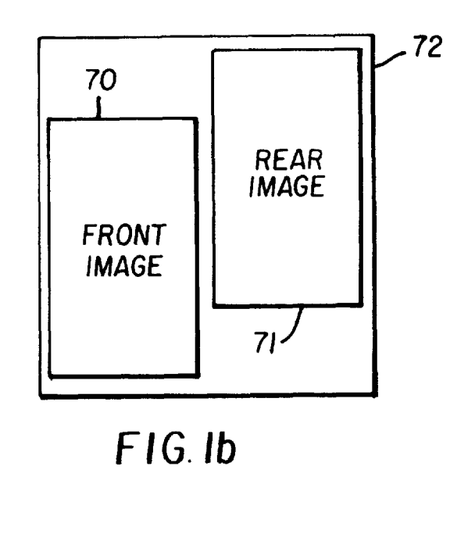
FIG. 1b illustrates a composite image which results when a duplex document scanner according to the present invention processes a duplex document.

FIG. 1a shows the input in the preferred embodiment of the present invention. It consists of a front image 70 and a rear image 71 from an image acquisition process. FIG. 1b shows the output from the process described above in a preferred embodiment of the present invention. It consists of a single composite image 72 consisting of the front image 70 and the rear image 71 captured on a single page. In producing the composite image 72, the front image 70 and rear image 71 were captured and their output was merged according to a preferred embodiment of the present invention.

Figure 2:
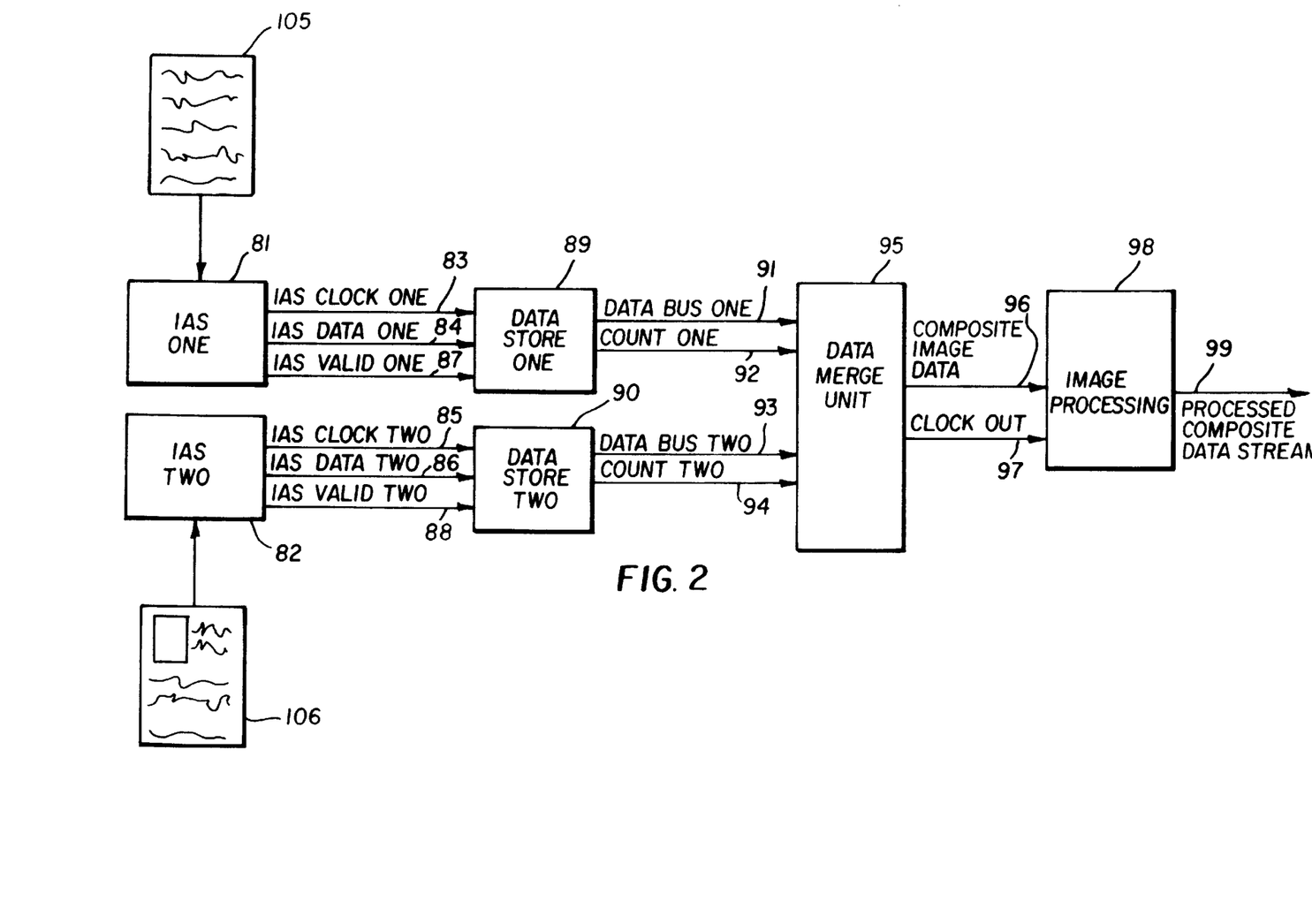
FIG. 2 depicts an apparatus for a duplex document scanner using a single image processor according to one embodiment of the present invention.

FIG. 2 shows a block diagram of the preferred embodiment of the present invention, consisting of a first image acquisition system (IAS) 81 and a second image acquisition system 82. According to the present invention, IAS one 81 receives image one 105 from one side of a two-sided document, and IAS two 82 receives image two 106 from the other side of the two-sided document. IAS one 81 produces the image data on IAS data one 84 according to IAS valid one 87 and at the rate of IAS clock one 83. Similarly, IAS two 82 produces the image data on IAS data two 86 according to IAS valid two 88 and at the rate of IAS clock two 85. The two output streams on data bus one 91 and data bus two 93 are merged according to the present invention by the data merge unit 95, which uses count one 92 and count two 94 to maintain synchronization between the two data streams. The data merge unit 95 produces the composite image data 96 and clock out 97. The composite image data 96 can then be processed by a single image processing system 98, which produces the processed composite data stream 99.

Data is written into data store one 89 and data store two 90 (containing the front and rear FIFOs, respectively) at 10 Mbytes/sec and read out at a rate greater than 20 Mbytes/sec. However, because the two FIFO write clocks are asynchronous to each other, a Phase Skew and Difference Frequency exists between the front and rear FIFO fill rates. This would make the merge logic very complex and would also require the input FIFOs to have additional memory storage to handle the data requirements imposed by the effects of the Phase Skew and Difference Frequency ($f_{diff}$).

Figure 3:
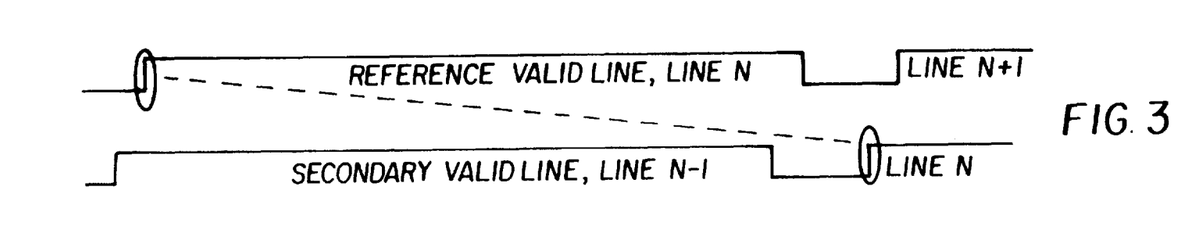
FIG. 3 shows matching rising edges on the valid lines of the reference and secondary system wherein the rising edge of the valid line of the secondary system lags the rising edge on the reference system by almost one full cycle.

The clock phase skew translates into a Valid Line phase skew as shown in FIG. 3. This skew of the Valid Line signal imposes the reservation of one line of storage in the input FIFOs to handle this case, where one line is defined as the number of pixels contained in one complete raster of the image. In a data merge operation one Valid Line must be selected as the reference Valid Line. The reference Valid Line will be used to start the merge operation but, as shown in FIG. 3, the secondary Valid Line may be nearly an entire line time out of phase with the reference. In this case, the reference input FIFO must store one entire line of input data while the IAS data merger waits for the secondary input FIFO to fill up with its' first valid line of data. Which Valid Line, front or rear, is selected as the reference has no effect on the additional FIFO memory requirement imposed by the line skew.

Besides having additional memory requirements because of the Phase Skew, there is also data accumulating over an image frame time as a consequence of the Difference Frequency that exists between the two asynchronous clock sources. The Difference Frequency exists because any two clock sources, no matter how ideal, will always have some variance between them unless one is phase locked to the other. To find the additional memory requirements imposed by the Difference Frequency, a detailed analysis of the Difference Frequency must be done.

The maximum Difference Frequency that exists between the front and rear image acquisition systems clocks occurs when one oscillator is at its maximum frequency and the other is at its minimum frequency. This definition yields the following equation for Difference Frequency ($f_{diff}$):

$$f_{diff} = f_{max} - f_{min} \qquad \text{EQ. 1}$$

The oscillator frequency chosen for this example has a nominal operating point of 10 MHz with a +/−100 PPM stability. Using EQ. 1 defined above, the maximum Difference Frequency between the two image acquisition systems is:

$$f_{diff} = 10{,}001{,}000 - 9{,}999{,}000 = 2{,}000 \text{ Hz.}$$

Once the Difference Frequency is found, the rate at which the two image acquisition systems clocks slip in relationship to each other must be found. This corresponds to the Slip Count, which is the number of clock cycles of the reference clock in which an extra data unit will be accumulated due to the Difference Frequency. The Slip Count is found by determining the number of oscillator cycles in the Difference Frequency which can be expressed with the following equation:

$$\text{Slip Count} = f_{max}/f_{diff} \qquad \text{EQ. 2}$$

Using EQ. 2, the Slip Count is:

$$\text{Slip Count} = 10{,}001{,}000/2{,}000 \text{ Hz} = 5{,}000.5$$

The Slip Count example above tells us that for every 5,000.5 clock cycles there will be a cycle of slippage between the front and rear image acquisition systems which means that one FIFO will accumulate an extra pixel of data. This can be verified by taking the minimum oscillator frequency period times the Slip Count minus the maximum oscillator frequency period times the Slip Count.

An example will be done here using the image acquisition systems to illustrate the concept. The nominal oscillator frequency for the image acquisition systems is 10 MHz with a +/−100 PPM stability which yields the following verification results shown in Table 1.

TABLE 1

Slippage Verification Results Case 1

| Calculations | Time |
| --- | --- |
| $1/f_{min}$ * Slip Count = | 500.100010001 . . . |
| 1/(9,990,000) * 5,000.5 = | $\mu$sec |
| $1/f_{max}$ * Slip Count = | 500 $\mu$sec |
| 1/(10,001,000) * 5,000.5 = | |
| Slippage time = | 100.010001 . . . nsec |
| 500.100010001 . . . $\mu$sec − 500 $\mu$sec = | |
| Clock period of minimum clock = | 100.010001 . . . nsec |
| 1/9,999,0000 = | |

From Table 1, it has been shown that under worst case conditions in the preferred embodiment of the present invention, there will be one additional pixel in the faster input FIFOs memory every 5,000.5 clock cycles. To find out how much additional memory is required to handle these additional pixels, the total number of pixels in an image frame must be determined. The basic equation for calculating the total number of pixels in an image frame is:

Image Frame Size=Scan Width * Resolution^2 * [Document length+IAS offset]   EQ. 3 where the IAS offset is equal to the physical separation of the two focal points for each IAS system.

Once the total number of pixels per image frame is known, the number of additional pixels generated by the faster clock can be found by dividing the image frame size by the Slip Count which yields the following equation:

Additional Pixels=Image Frame Size/Slip Count.   EQ. 4

The system described in this document has 3,650 pixels per line at 300 DPI. Using EQ. 3 and EQ. 4 defined above, the total number of additional pixels for a 12″ wide by 26″ long document with a 1″ IAS offset can be calculated as follows:

Additional Pixels=(12* 300^2* [26+1])/5,000.5=5,832 pixels.

In addition to the two additional memory requirements already discussed, there is one more additional memory requirement imposed on the input FIFOs by the IAS data merger itself. In FIG. 2, the data merge unit 95 cannot start reading data from the reference FIFO until the secondary FIFO is at least ⅓ full or more. If the IAS data merger starts reading from the reference FIFO and then switches to the secondary FIFO there must be enough data in the secondary FIFO to support reading until the end of line. If the secondary FIFO did not have enough data in it to support a full line read then the merged output data stream would be discontinuous. A discontinuous data stream would prevent the IAS data merger from generating a correctly delayed Valid Line output.

Using the three additional memory requirements discussed, a Total Additional Memory Requirement (TAMR) can be found by adding up all the individual requirements yielding the following equation:

TAMR=Line+Additional Pixels+⅓ * Line.   EQ. 5

Now using EQ. 5, the Total Additional Memory Requirement (TAMR) for the input FIFOs can be determined for the 26″ input document with a 1″ IAS offset:

TAMR=3,650+5,832+⅓ * 3,650=10,699 pixels.

From the calculation listed above, 10,699 pixels would have to be stored to support a 26″ document under worst case conditions.

Figure 4:
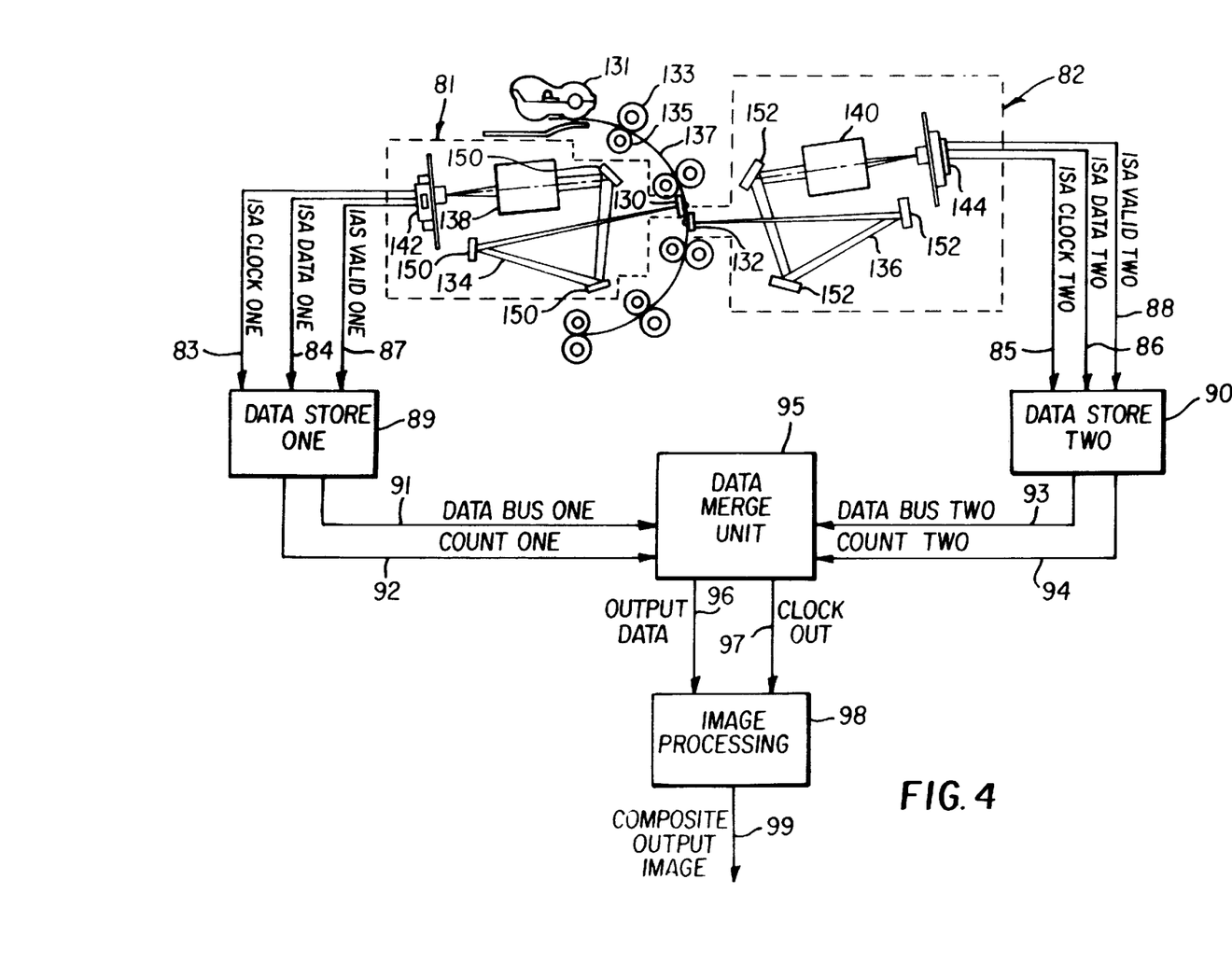
FIG. 4 depicts a detailed view of the apparatus used to simultaneously acquire two channels of asynchronous image data from a two-sided document and then combine those data streams into a single output data stream according to the present invention.

FIG. 4 shows a detailed view of the preferred embodiment of the apparatus depicted by the block diagram shown in FIG. 2. It consists of IAS one 81 and IAS two 82. Each IAS includes an aperture 130 and 132. The document feeder module 131 advances the document to be scanned through the transport driver 133 and transport idler 135 along paper path 137. As the document continues along paper path 137, it passes the apertures 130 and 132, which simultaneously scan both sides of the document.

For IAS One 81, the scanned image proceeds along image path 134, and is reflected by mirrors 150 through the lens assembly 138. The lens assembly 138 focuses the scanned document image into the camera/CCD module 142. This produces the raster data stream on IAS data one 84, which is clocked into the data store one 89 according to IAS clock one 83 and IAS valid one 87. The identical sequence of events occurs for IAS Two 82, which produces the raster data stream along IAS data two 86. The IAS data merger 95 interleaves the data units from these two data and produces the output data stream 96 along with clock out 97. This single data stream then gets processed by the image processing system 98, which results in the composite output image 99.

Figure 5:
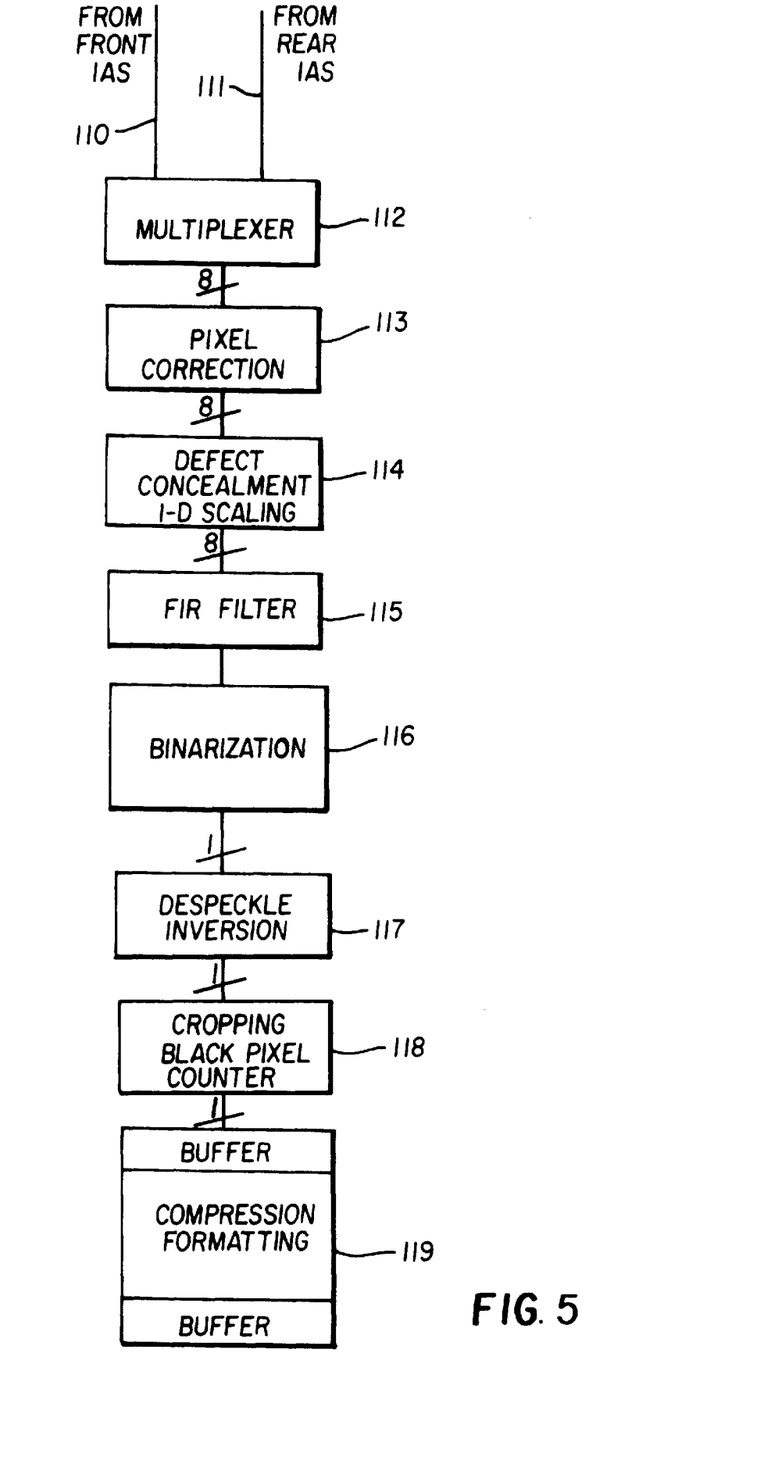
FIG. 5 is a system data path for a duplex document scanner according to the present invention.

FIG. 5 shows the image processing which occurs on the data from the front IAS and rear IAS in the preferred embodiment. It further demonstrates the savings which result when employing the method set forth in the present invention. Once the input from the front IAS 110 and from the rear IAS 111 has been merged according to the method of the present invention by the multiplexer 112, the composite image data can then be processed by a single image processor. This could, by way of example only and according to the preferred embodiment, consist of pixel correction 113; pixel defect concealment and one dimensional scaling 114; finite impulse response (FIR) filtering 115; binarization 116; despeckling and inversion 117; cropping and black pixel detection 118; and compression and formatting 119.

In the preferred embodiment of the present invention, pixel correction is used to compensate for pixel-to-pixel variations, and lens and lamp fall-off, which are the inconsistencies in the light distribution introduced by the optics. 1-D Scaling performs 1:1 (300 DPI) or 3:2 (200 DPI) scaling in the fast scan direction. The slow scan direction is scaled by the transport speed. Pixel defect concealment is used to detect and mask single pixel defects in the CCD. Several methods are possible, with the simplest being pixel replication. Bilinear interpolation is another method. The FIR Filter function is used to enhance the gray-scale image prior to binarization. Depending on the type of enhancement desired (lowpass, bandpass, or highpass), a FIR filter can be implemented to help reduce noise and aliasing effects. IIR filters may also be implemented.

Binarization is used to convert gray-scale image data to binary image data. There are several types of binarization techniques that can be applied to an image. Some techniques include dynamic thresholding (refer to U.S. Pat. No. 5,583, 659), dithering, error diffusion, and fixed thresholding. In the preferred embodiment, dynamic thresholding, dithering, or fixed thresholding may be applied to the image.

Figure 6:
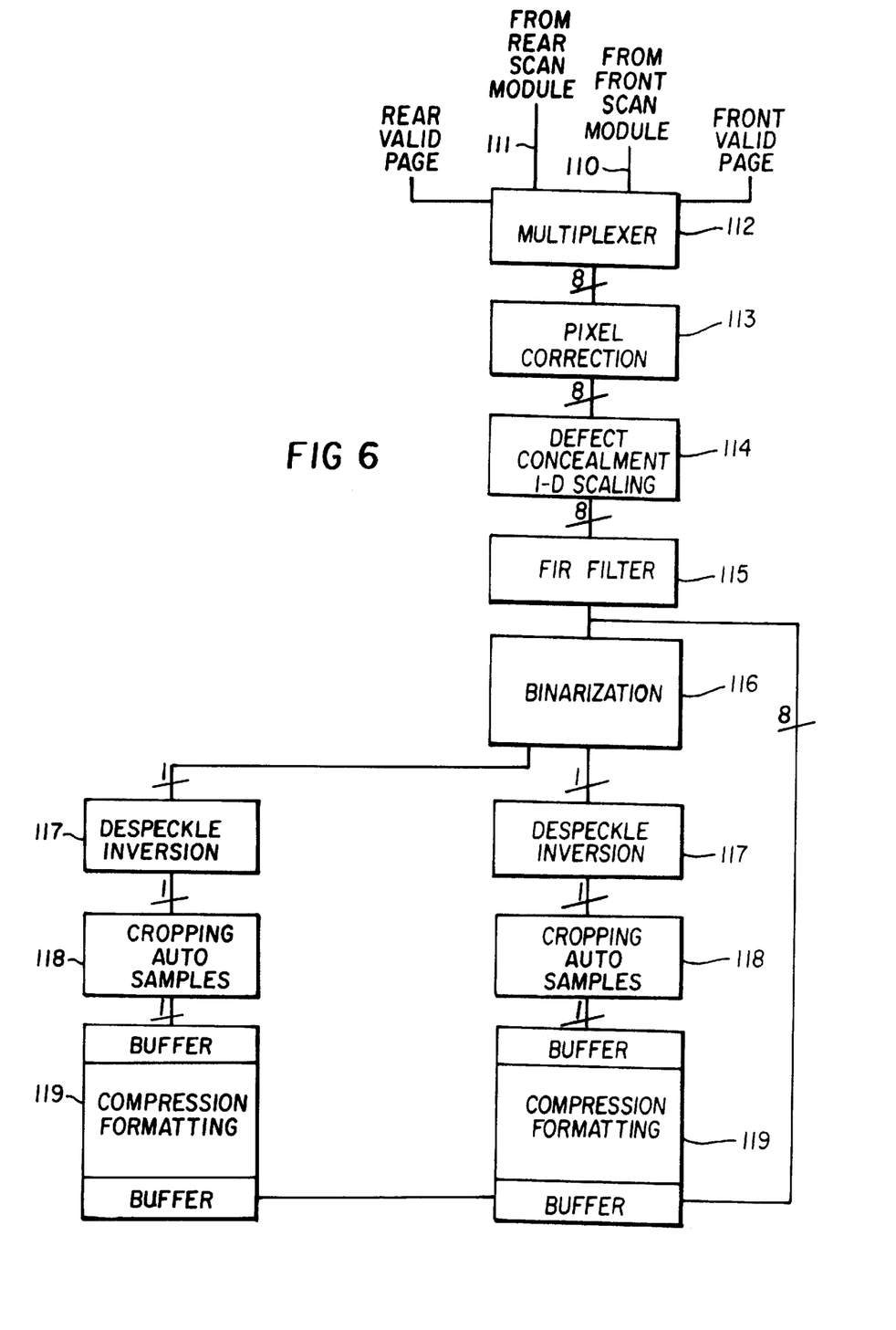
FIG. 6 is a system data path for another embodiment of a duplex document scanner according to the present invention.

Also, in an alternate embodiment, the front and rear images can be independently located in the composite image and have different binarization techniques applied to them as shown in FIG. 6. This embodiment is preferred when the information on a first side is different from the information on a second side, for example, one side may contain images and the other side contains only text. Thus, the most efficient algorithms to process the two different types of information most efficiently would be different, and the first and second digital image would be split out of the composite image after the gray-scale procedure described above.

Despeckling is used to remove any single pixel noise in the image. This may be done after splitting the images as shown in FIG. 6, or if processing the images together as shown in FIG. 5. Inversion is used to convert black pixels to white and vice versa. Cropping cuts the image to a pre-defined size. If the document scanned is shorter than the cropping parameters specify, the image is cropped to the document length. The black pixel counter is a function which aids in the detection of blank images (e.g. a blank sheet of paper). It calculates the total number of black pixels in the document and reports the results back to the system controller. The system controller can then use this information in conjunction with image dimensions to determine the black (or white) content of a document. If the system controller determines that the page is blank, the system controller can remove it from its queue. This function is also useful in detecting dead lamps. Compression reduces the binary image data using CCITT group 3, CCITT group 3-2D, CCITT group 4, and JBIG compression standards. Certainly, other compression techniques could also be employed. Formatting orders the pixels in little endian or big endian mode.

The invention has been described in detail with particular reference to certain preferred embodiments thereof, but it will be understood that variations and modifications can be effected within the spirit and scope of the invention.

PARTS LIST

| | |
|---|---|
| 70 | front image |
| 71 | rear image |
| 72 | composite image |
| 81 | first image acquisition system |
| 82 | second image acquisition system |
| 83 | IAS clock one |
| 84 | IAS data one |
| 85 | IAS clock two |
| 86 | IAS data two |
| 87 | IAS valid one |
| 88 | IAS valid two |
| 89 | data store one |
| 90 | data store two |
| 91 | data bus one |
| 92 | count one |
| 93 | data bus two |
| 94 | count two |
| 95 | data merge unit |
| 96 | composite image data |
| 97 | clock out |
| 98 | single image processing system |
| 99 | data composite stream |
| 99 | output image |
| 105 | image one |
| 106 | image two |
| 110 | front IAS |
| 111 | rear IAS |
| 112 | multiplexer |
| 113 | pixel correction |
| 114 | one dimensional scaling |
| 115 | finite impulse response filtering |
| 116 | binarization |
| 117 | despeckling and inversion |
| 118 | black pixel detection |
| 119 | compression and formatting |
| 130,132 | aperture |
| 131 | document feeder module |
| 133 | transport driver |
| 134 | image path |
| 135 | transport idler |

-continued

PARTS LIST

| | |
|---|---|
| 137 | paper path |
| 138 | lens assembly |
| 142 | camera/CCD module |
| 150 | mirrors |

What is claimed is:

1. A duplex document scanner for processing multiplexed images with a single data path comprising:
   a document transport for moving documents;
   a first image acquisition system for creating a first digital image of a first side of each of said documents which is stored to a first data storage unit;
   a second image acquisition system for creating a second digital image of a second side of each of said documents which is stored to a second data storage unit, wherein an output from said first image acquisition system is asynchronous with an output from said second image acquisition system; and
   an image processing board comprising a data merge unit which synchronizes said output from said first data storage unit and said output from said second data storage unit and merges said first digital image and said second digital image.

2. A duplex document scanner as in claim 1 wherein a system controller transfers said merged first and second digital image to a storage device.

3. A duplex document scanner as in claim 1 wherein said image processing board enhances said first digital image and said second digital image.

4. A duplex document scanner as in claim 1 wherein an input tray holds at least one document.

5. A duplex document scanner as in claim 4 wherein a document feeder moves documents from said input tray to said document transport.

6. A duplex document scanner as in claim 5 wherein an exit hopper accumulates said documents after transport through said document transport.

7. A duplex document scanner as in claim 1 wherein said merged first digital and second digital images are subjected to gray-scale processing.

8. A duplex document scanner as in claim 7 wherein said merged first digital image and second digital image are separated after a binarization step.

9. A duplex document scanner as in claim 1 wherein said merged first digital and second digital images are subjected to binary processing.

10. A duplex document scanner as in claim 1 wherein said merged first digital image and second digital image are separated after a gray-scale processing and said first digital image and said second digital image are separately subjected to a binary processing.

11. A duplex document scanner for processing multiplexed images with a single data path comprising:
    a document transport for moving documents;
    an input tray which holds at least one document;
    a document feeder which moves said documents from said input tray to said document transport;
    an exit hopper which accumulates said documents after transport through said document transport;
    a first image acquisition system for creating a first digital image of a first side of each of said documents which is stored to a first data storage unit;

a second image acquisition system for creating a second digital image of a second side of each of said documents which is stored to a second data storage unit, wherein an output from said first image acquisition system is asynchronous with an output from said second image acquisition system; and an image processing board comprising a data merge unit which synchronizes said output from said first data storage unit and said output from said second data storage unit and merges said first digital image and said second digital image.

12. A duplex document scanner as in claim 11 wherein a system controller transfers said merged first and second digital image to a storage device.

13. A duplex document scanner as in claim 11 wherein said image processing board enhances said first digital image and said second digital image.

14. A duplex document scanner as in claim 11 wherein said merged first digital and second digital images are subjected to gray-scale processing.

15. A duplex document scanner as in claim 14 wherein said merged first digital image and second digital image are separated after a binarization step.

16. A method for scanning duplex documents comprising the steps of:

transporting said documents past a first image acquisition system and a second image acquisition system;

wherein said first image acquisition system creates a first digital image of a first side of each of said documents;

saving said first digital image to a first data storage unit;

wherein said second image acquisition system creates a second digital image of a second side of each of said documents;

saving said second digital image to a second data storage unit;

wherein an output from said first image acquisition system is asynchronous with an output from said second image acquisition system;

synchronizing an output from said first data storage unit and an output from said second image acquisition system;

merging said first digital image and said second digital image to produce a composite image; and processing said composite image.

* * * * *